(12) United States Patent
Zhao et al.

(10) Patent No.: US 10,678,090 B2
(45) Date of Patent: Jun. 9, 2020

(54) LIQUID CRYSTAL DISPLAY MODULE AND LIQUID CRYSTAL DISPLAY

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xiaochuan Chen, Beijing (CN); Qian Wang, Beijing (CN); Haisheng Wang, Beijing (CN); Jian Gao, Beijing (CN); Ming Yang, Beijing (CN); Pengcheng Lu, Beijing (CN); Rui Xu, Beijing (CN); Lei Wang, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/526,827

(22) PCT Filed: Jun. 2, 2016

(86) PCT No.: PCT/CN2016/084488
§ 371 (c)(1),
(2) Date: May 15, 2017

(87) PCT Pub. No.: WO2017/161691
PCT Pub. Date: Sep. 28, 2017

(65) Prior Publication Data
US 2018/0107059 A1  Apr. 19, 2018

(30) Foreign Application Priority Data

Mar. 23, 2016 (CN) .......................... 2016 1 0169773

(51) Int. Cl.
*G02F 1/1335* (2006.01)
*G02F 1/29* (2006.01)
(Continued)

(52) U.S. Cl.
CPC ... *G02F 1/133528* (2013.01); *G02B 27/1006* (2013.01); *G02F 1/137* (2013.01);
(Continued)

(58) Field of Classification Search
CPC ................................................. G02F 1/133528
See application file for complete search history.

(56) References Cited

U.S. PATENT DOCUMENTS

2013/0300986 A1    11/2013  Kang
2014/0063381 A1*   3/2014   Zhang ................ H04N 13/398
                                                                  349/15
(Continued)

FOREIGN PATENT DOCUMENTS

CN    102830540 A    12/2012
CN    103048841 A    4/2013
(Continued)

OTHER PUBLICATIONS

International Search Report for Chinese International Application No. PCT/CN2016/084488 dated Nov. 11, 2016.
(Continued)

*Primary Examiner* — Edmond C Lau
(74) *Attorney, Agent, or Firm* — Calfee, Halter & Griswold LLP (57) ABSTRACT

A liquid crystal display module and a liquid crystal display are provided. The liquid crystal display module includes a first substrate and a second substrate cell-aligned with each other, and a liquid crystal layer disposed between the first substrate and the second substrate; the first substrate or the second substrate includes a plurality of electrode sets, each
(Continued)

electrode set including a plurality of mutually insulated electrodes. One of the electrode sets is disposed in each sub-pixel region of the liquid crystal display panel. The first substrate or the second substrate also includes a common electrode. The liquid crystal display module further includes a first polarizer disposed on the first substrate. The first substrate is disposed adjacent to a light incident side.

20 Claims, 5 Drawing Sheets

(51) Int. Cl.
    *G02F 1/137* (2006.01)
    *G02B 27/10* (2006.01)
    *G02F 1/133* (2006.01)
    *G02F 1/1337* (2006.01)
    *G02F 1/1343* (2006.01)
    *G09G 3/36* (2006.01)
    *G09G 3/34* (2006.01)

(52) U.S. Cl.
    CPC ...... *G02F 1/13306* (2013.01); *G02F 1/13439* (2013.01); *G02F 1/133514* (2013.01); *G02F 1/133753* (2013.01); *G02F 1/134309* (2013.01); *G02F 1/29* (2013.01); *G09G 3/3607* (2013.01); *G02F 2001/133531* (2013.01); *G02F 2001/134345* (2013.01); *G02F 2001/294* (2013.01); *G02F 2201/121* (2013.01); *G09G 3/3406* (2013.01); *G09G 3/36* (2013.01); *G09G 2300/0478* (2013.01); *G09G 2310/027* (2013.01); *G09G 2320/0233* (2013.01); *G09G 2354/00* (2013.01)

(56) References Cited

U.S. PATENT DOCUMENTS

| | | | |
|---|---|---|---|
| 2014/0152925 A1 | 6/2014 | Wu | |
| 2014/0160177 A1* | 6/2014 | Smith | G09G 3/3659 345/690 |
| 2015/0219911 A1* | 8/2015 | Cho | G02F 1/1393 349/15 |
| 2016/0054573 A1* | 2/2016 | Kasano | G02B 27/2214 349/33 |
| 2016/0085120 A1 | 3/2016 | Xu | |
| 2016/0342025 A1 | 11/2016 | Xie | |

FOREIGN PATENT DOCUMENTS

| | | |
|---|---|---|
| CN | 203930227 U | 11/2014 |
| CN | 104298042 A | 1/2015 |
| CN | 104460130 A | 3/2015 |
| CN | 105511179 A | 4/2016 |
| CN | 105572984 A | 5/2016 |

OTHER PUBLICATIONS

First Office Action for Chinese Patent Application No. 201610169773.1 dated Jan. 3, 2017.

* cited by examiner

LIQUID CRYSTAL DISPLAY MODULE AND LIQUID CRYSTAL DISPLAY

RELATED APPLICATIONS

The present application is the U.S. national phase entry of PCT/CN2016/084488, with an international filing date of Jun. 2, 2016, which claims the benefit of Chinese Patent Application No. 201610169773.1, filed on Mar. 23, 2016, the entire disclosures of which are incorporated herein by reference.

TECHNICAL FIELD

The present disclosure relates to the field of display technology, and more particularly to a liquid crystal display module and a liquid crystal display.

BACKGROUND

As the display technology becomes increasingly mature, various displays have gradually developed. At present, liquid crystal displays (briefly known as LCDs) are more and more widely applied due to advantages such as little power consumption, miniaturization, light weight and thin thickness, and so on.

An existing liquid crystal comprises two polarizers having light transmitting axes perpendicular with each other and a liquid crystal panel located between the upper and lower polarizers. The principle of greyscale display is that the lower polarizer converts a natural light into linearly polarized light; the deflection status of liquid crystals is controlled by voltages so as to convert the linearly polarized light into elliptically polarized light, and the upper polarizer analyses polarization of the elliptically polarized light so as to realize different greyscale displays.

SUMMARY

A liquid crystal display module, a liquid crystal display, and a novel way to realize different greyscale displays are provided in embodiments of the present disclosure.

In one aspect, there is provided a liquid crystal display module comprising a first substrate and a second substrate cell-aligned with each other and a liquid crystal layer disposed between the first substrate and the second substrate. The first substrate or the second substrate comprises a plurality of electrode sets, each electrode set including a plurality of mutually insulated electrodes, and wherein one of the electrode sets is disposed in each sub-pixel region of the liquid crystal panel. The first substrate or the second substrate also comprises a common electrode. The liquid crystal display module further comprises a first polarizer disposed on the first substrate wherein the first substrate is disposed adjacent to a light incident side.

In an embodiment of the present disclosure, the electrode set comprises a plurality of stripe electrodes.

In an embodiment of the present disclosure, the electrode set comprises a plurality of electrodes arranged in an array.

In an embodiment of the present disclosure, the liquid crystal display module further comprises a second polarizer disposed on a side of the second substrate away from the liquid crystal layer, and a light transmission axis of the second polarizer is parallel to a light transmission axis of the first polarizer.

In an embodiment of the present disclosure, the liquid crystal display module further comprises a color film layer.

In an embodiment of the present disclosure, the liquid crystal display module further comprises a beam splitting film layer.

In an embodiment of the present disclosure, a light transmission axis of the first polarizer is parallel to an initial orientation of long axes of liquid crystal molecules in the liquid crystal layer.

In an embodiment of the present disclosure, the common electrode is a planar common electrode.

In another aspect, a liquid crystal display is also provided in embodiments of the present disclosure that comprises the liquid crystal display module and a backlight source that emits parallel light towards the first substrate.

In an embodiment of the present disclosure, the liquid crystal display further comprises a camera and a controller wherein the camera is used for tracing a position of human eyes and the controller is used for controlling light emitted from the backlight source to be refracted by the liquid crystal layer towards the position of the human eyes traced by the camera.

A liquid crystal display module and a liquid crystal display are provided in embodiments of the present disclosure. In an embodiment of the present disclosure, each sub-pixel region is provided with one electrode set and each electrode set comprises a plurality of mutually insulated electrodes. Thus, a deflection angle of liquid crystals in each sub-pixel region can be controlled by controlling voltages of the electrodes in the electrode set, so as to change equivalent refractivity of liquid crystal molecules and thereby control a divergence angle of parallel polarized light. When all of the electrodes in the electrode set have the same voltage, deflection angles of the liquid crystals are the same, i.e., the equivalent refractivity of the liquid crystal molecules is the same. Thus, parallel polarized light is refracted towards the same direction and the divergence angle thereof is small. In this case, the light in a space has a greater energy density, and thus high greyscale display can be realized with respect to viewing position of the human eyes. When all of the electrodes in the electrode set do not have the same voltage, deflection angles of the liquid crystals are not the same, i.e., equivalent refractivity of the liquid crystal molecules is not the same. Thus parallel polarized light is refracted towards different directions and the divergence angle thereof is large. In this case, the light in the space has a smaller energy density, and thus low greyscale display can be realized with respect to the viewing position of the human eyes. Based on this, according to requirements of the liquid crystal display module, high greyscale display or low greyscale display can be realized by controlling each sub-pixel region, so that the liquid crystal display module can realize different greyscale displays.

BRIEF DESCRIPTION OF DRAWINGS

To more clearly explain the technical solutions of embodiments of the present disclosure or the prior art, the drawings used in describing the embodiments or the prior art will be briefly introduced below. It is apparent that the below-described drawings are merely some embodiments of the present disclosure. Other drawings can be derived from these drawings by those ordinary skilled in the art without undue experimentation.

THE REFERENCE SIGNS ARE

10. first substrate; 20. second substrate; 30. liquid crystal layer; 40. first polarizer; 50. electrode set; 501. electrode; 60. common electrode; 70. second polarizer; 80. color film membrane; and 90. backlight source.

DETAILED DESCRIPTION OF EMBODIMENTS

The technical solutions of embodiments of the present disclosure are described below clearly and completely in connection with the drawings of embodiments of the present disclosure. Apparently, the embodiments described are only a part, not the whole, of the embodiments of the present disclosure. All of other embodiments derived by those ordinary skilled in the art based on the embodiments of the present disclosure without undue experimentation fall within the protective scope of the present disclosure.

Unless otherwise specified, the technical terms or scientific terms as used herein shall have general meanings as understood by those skilled in the art. Words "First", "second" and the like used in the description and claims of the present disclosure do not indicate any order, number or importance, but are used to distinguish different components.

Figure 1:
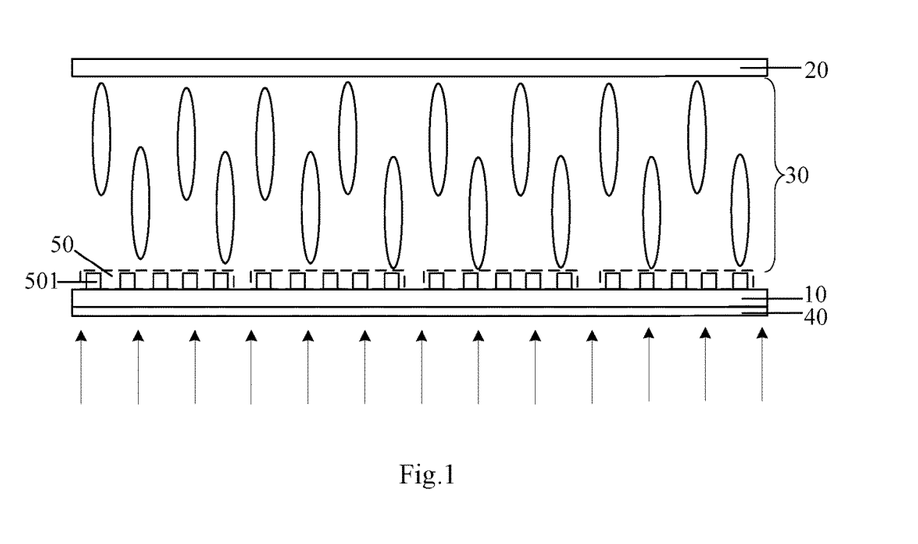
FIG. 1 is a schematic structural view of a liquid crystal display module provided according to an embodiment of the present disclosure.
Figure 2:
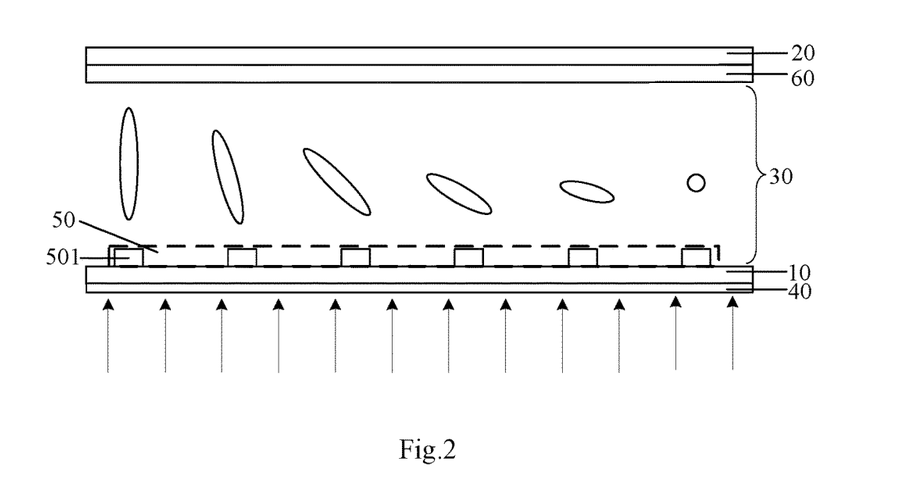
FIG. 2 is a schematic view of equivalently forming a prism by means of liquid crystals, provided according to an embodiment of the present disclosure.

As shown in FIGS. 1 and 2, a liquid crystal display module provided according to an embodiment of the present disclosure comprises a first substrate 10 and second substrate 20 cell-aligned with each other, and a liquid crystal layer 30 disposed between the first substrate 10 and the second substrate 20.

The first substrate 10 or the second substrate 20 comprises a plurality of electrode sets 50, each electrode set including a plurality of mutually insulated electrodes 501; wherein one electrode set 50 is disposed in each sub-pixel region of the liquid crystal display panel; the first substrate 10 or the second substrate 20 also comprises a common electrode 60. The common electrode 60 may be a planar common electrode, a strip-like common electrode or a common electrode in the form of an array.

The liquid crystal display module further comprises a first polarizer 40 disposed on the first substrate 10 that is used to convert parallel light into parallel polarized light. The first substrate 10 is disposed adjacent to a light incident side.

In order to drive liquid crystals to deflect, the common electrode 60 and the electrode sets 50 may be arranged on different substrates, or on the same substrate. For instance, the electrode sets 50 are arranged on the first substrate 10 and the common electrode 60 is arranged on the second substrate 20. Or, the electrode sets 50 are arranged on the second substrate 20 and the common electrode 60 is arranged on the first substrate 10. Of course, the electrode sets 50 may be arranged on the first substrate 10 or the second substrate 20 together with the common electrode 60. The embodiments of the present disclosure are schematically explained in an example in which the electrode sets 50 are arranged on the first substrate 10 and the common electrode 60 is arranged on the second substrate 20.

By using the following principle, the liquid crystal display module provided according to the embodiment of the present disclosure realizes different greyscale displays. As shown in FIG. 2, in the event that the common electrode 60 is at the same voltage, the deflection status of liquid crystals in each sub-pixel region can be controlled by applying different voltages to the plurality of electrodes 501 of the electrode set 50 in the sub-pixel region (namely, making equivalent refractivity of liquid crystal molecules in the sub-pixel region changed), thereby controlling a divergence angle of parallel polarized light and thus controlling energy density of light in a space so as to realize high and low greyscale displays.

Since the embodiment of the present disclosure is provided with a first polarizer 40 here, unidirectional polarized light can be formed when the parallel light passes through the first polarizer 40. The equivalent refractivity of liquid crystal molecules in each sub-pixel region can be calculated according to refraction of the unidirectional polarized light by long axes or short axes of the liquid crystals. Generally, optical axes of liquid crystals are identical with the long axes of liquid crystal molecules. In the above arrangement, for the liquid crystal molecules, the polarized light passed through the first polarizer 40 is unusual light. If the long axes of the liquid crystal molecules are rotated due to an applied electric field, the refractivity of the unusual light changes accordingly. Thus, in an embodiment of the present disclosure, a light transmission axis of the first polarizer 40 is parallel to an initial orientation of the long axes of the liquid crystal molecules in the liquid crystal layer 30.

In the context of the present disclosure, "initial orientation of the long axes of the liquid crystal molecules" refers to directions of the long axes of the liquid crystal molecules when an external electric field is not applied thereto. Therefore, alternatively, the initial orientation of the long axes of the liquid crystal molecules in the liquid crystal layer 30 may also be perpendicular to the first substrate (as shown in FIG. 1). Moreover, the electrodes 501 in the electrode set 50 are disposed in such a manner that with increase of the voltages of the electrodes 501, the long axes of the liquid crystal molecules gradually become parallel to the light transmission axis of the first polarizer 40.

In the embodiment of the present disclosure, based on the above description, the deflection status of liquid crystals can be controlled so as to refract the parallel polarized light towards the same direction or different directions. In this case, the liquid crystals perform the same function as a prism, and thus the liquid crystals in each sub-pixel region are actually equivalent to a prism.

Figure 3A:
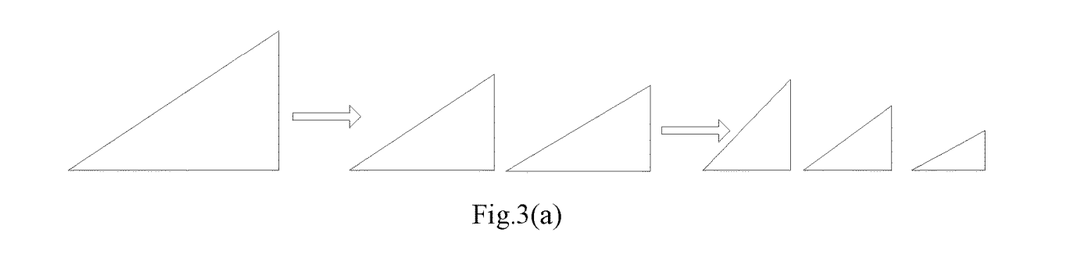
FIG. 3(a) is a structural schematic view of a right-angled prism equivalently formed by means of liquid crystals, provided according to an embodiment of the present disclosure.
Figure 3B:
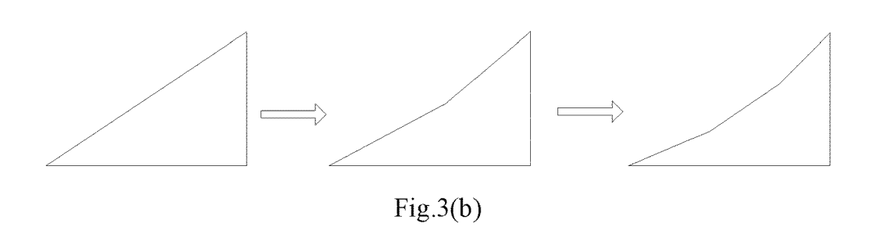
FIG. 3(b) is a structural schematic view of an irregular prism equivalently formed by means of liquid crystals, provided according to an embodiment of the present disclosure.
Figure 3C:
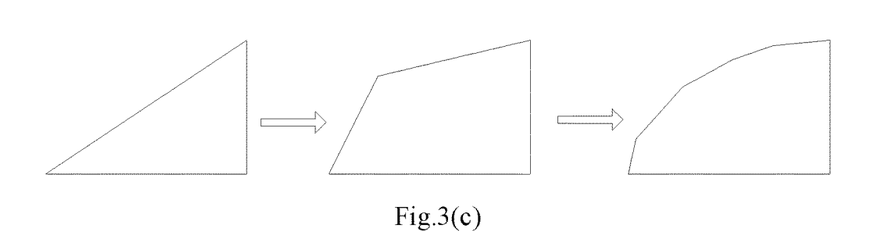
FIG. 3(c) is a structural schematic view of a further irregular prism equivalently formed by means of liquid crystals, provided according to an embodiment of the present disclosure.

Here, by controlling voltages of a plurality of electrodes 501 in an electrode set 50, liquid crystals may equivalently form various forms of prisms, for instance, a right-angled prism as shown in FIG. 3(*a*) or an irregular prism as shown in FIG. 3(*b*) or 3(*c*).

Particularly, when voltages of electrodes 501 of an electrode set 50 in a sub-pixel region is controlled so that the liquid crystals in the region equivalently form a prism, parallel polarized light can be refracted towards the same direction so as to realize high greyscale display. When the voltages of the electrodes 501 of the electrode set 50 in the sub-pixel region is controlled so that the liquid crystals in the region equivalently form a plurality of prisms, the parallel polarized light can be refracted towards different directions so as to realize low greyscale display For example, as shown in FIG. 3(*a*), for any sub-pixel region, deflection status of liquid crystals can be controlled according to requirements for display greyscales by controlling voltages of electrodes 501 in an electrode set 50 can be controlled, so as to equivalently form one or more prisms (FIG. 3(*a*) schematically illustrates one prism, two prisms and three prisms that are equivalently formed). As the number of equivalently formed prisms in the sub-pixel region increases, a divergence angle of light emitted from the liquid crystal display module gradually become larger and light energy gradually changes from dense to sparse, thus realizing a change from high greyscale display to low greyscale display.

Of course, different greyscale displays can also be realized by controlling forms of equivalently formed prisms.

For example, as shown in FIG. 3(*b*) or 3(*c*), for any sub-pixel region, deflection status of liquid crystals can be controlled according to requirements for display greyscales by controlling voltages of electrodes 501 in an electrode set 50, so as to equivalently form a prism with one bevel edge further to a heteromorphic prism with a plurality of bevel edges. In this way, a divergence angle of light emitted from the liquid crystal display module gradually becomes larger and light energy gradually changes from dense to sparse, thus realizing a change from high greyscale display to low greyscale display.

The equivalent prisms formed by controlling the voltages of the electrodes 501 in the electrode set 50 are not limited to shapes as shown in FIG. 3(*b*) or FIG. 3(*c*), and may be any other shapes.

It is to be explained that first, the number of electrodes 501 in each electrode set 50 shall be reasonably arranged according to size of the sub-pixel region and size of the electrodes 501.

Voltage of each electrode 501 in an electrode set 50 can be controlled separately. Particularly, the voltages of the electrodes 501 in the electrode set 50 can be controlled according to requirements for sub-pixel greyscale display.

Shapes of the electrodes 501 in the electrode set 50 are not limited.

Second, the parallel light may be light perpendicular to the first substrate 10 or the second substrate 20, and may be, of course, light not perpendicular to the first substrate 10 or the second substrate 20.

Third, the first polarizer 40 may be disposed at a side of the first substrate 10 away from the liquid crystal layer 30, or at a side of the first substrate 10 adjacent to the liquid crystal layer 30 (the drawings of the embodiment of the present disclosure schematically illustrates the first polarizer 40 is disposed at a side of the first substrate 10 away from the liquid crystal layer 30).

A liquid crystal display module is provided in the embodiment of the present disclosure. Since each sub-pixel region is provided with one electrode set 50 and each electrode set 50 comprises a plurality of mutually insulated electrodes 501, deflection angles of liquid crystals in each sub-pixel region can be controlled by controlling voltages of the electrodes 501 in the electrode set 50, so that equivalent refractivity of the liquid crystal molecules changes and thus divergence angle of parallel polarized light can be controlled. When all of the electrodes 501 in the electrode set 50 have the same voltage, deflection angles of liquid crystals are the same, i.e., refractivity of liquid crystal molecules is the same. Thus parallel polarized light is refracted towards the same direction and a divergence angle thereof is smaller. In this case, the light in the space has a greater energy density. Thus, high greyscale display can be realized with respect to a viewing position of human eyes. When all of the electrodes 501 in the electrode set 50 do not have the same voltage, deflection angles of the liquid crystals are not the same, i.e., refractivity of the liquid crystal molecules is not the same. Thus, the parallel polarized light is refracted towards different directions and a divergence angle thereof is larger. In this case, the light in the space has a smaller energy density, and thus low greyscale display can be realized with respect to viewing positions of human eyes. Based on this, according to requirements of the liquid crystal display module, the liquid crystal display module can realize different greyscale displays by controlling each sub-pixel region to realize high greyscale display or low greyscale display.

Figure 4A:
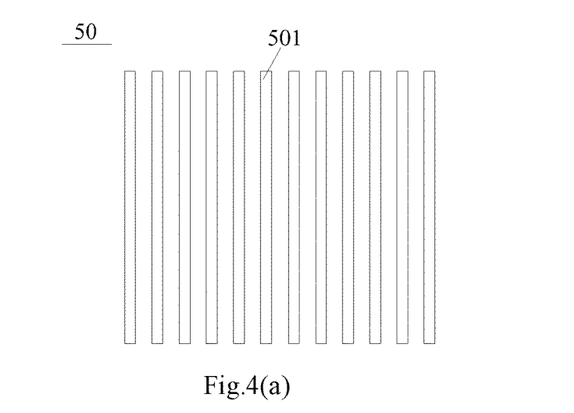
FIG. 4(a) is a structural schematic view of an electrode set comprising stripe electrodes provided according to an embodiment of the present disclosure.
Figure 4B:
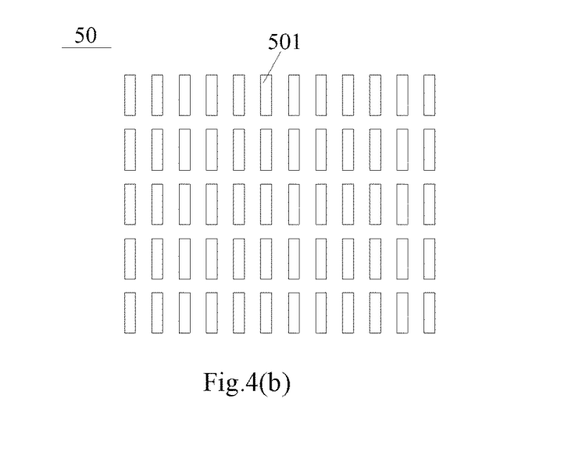
FIG. 4(b) is a structural schematic view of a further electrode set comprising stripe electrodes provided according to an embodiment of the present disclosure.

In an embodiment of the present disclosure, as shown in FIGS. 4(*a*) and 4(*b*), the electrode set 50 comprises a plurality of stripe electrodes.

Here, the stripe electrode, for example, may be a continuous stripe electrode 501 as shown in FIG. 4(*a*) or a discontinuous stripe electrode 501 as shown in FIG. 4(*b*).

Figure 5A:
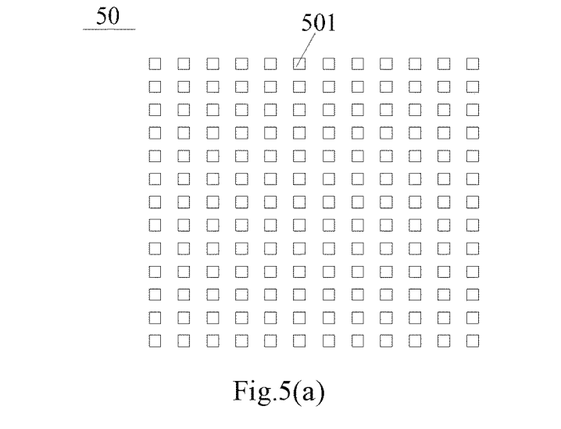
FIG. 5(a) is a structural schematic view of an electrode set comprising arrayed electrodes provided according to an embodiment of the present disclosure.
Figure 5B:
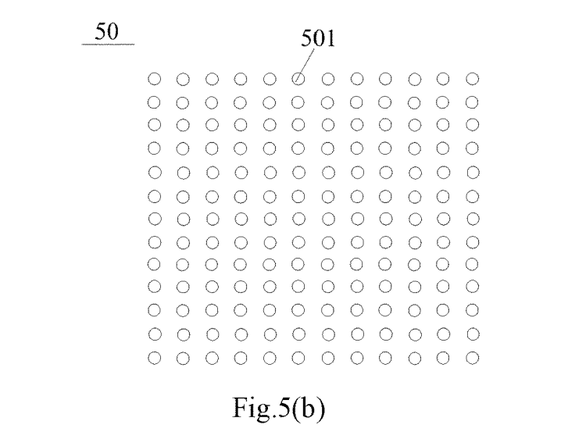
FIG. 5(b) is a structural schematic view of a further electrode set comprising arrayed electrodes provided according to an embodiment of the present disclosure.

In an embodiment of the present disclosure, as shown in FIGS. 4(*b*), 5(*a*) and 5(*b*), the electrode set 50 comprises a plurality of electrodes 501 arranged in an array.

Shapes of the plurality of electrodes 501 arranged in the array, for example, may be stripe as shown in FIG. 4(*b*), square as shown in FIG. 5(*a*), or circular as shown in FIG. 5(*b*).

Figure 6:
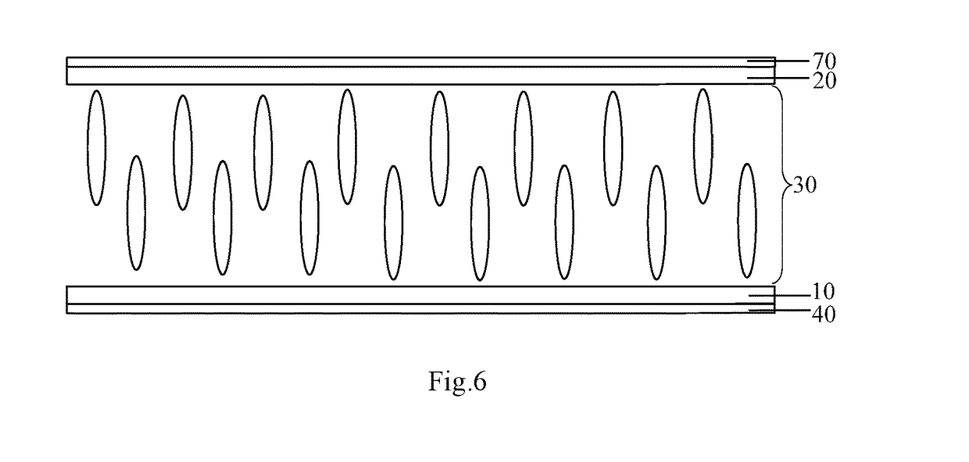
FIG. 6 is a structural schematic view of a further liquid crystal display module, provided according to an embodiment of the present disclosure.

In an embodiment of the present disclosure, as shown in FIG. 6, the liquid crystal display module further comprises a second polarizer 70 disposed at a side of the second substrate 20 away from the liquid crystal layer 30. A light transmission axis of the second polarizer 70 is parallel to the light transmission axis of the first polarizer 40.

In the embodiment of the present disclosure, since the second polarizer 70 is disposed at the side of the second substrate 20 away from the liquid crystal layer 30, noise waves in the light emitted from the liquid crystal display module can be removed so as to improve display quality.

In an embodiment of the present disclosure, as shown in FIGS. 7(a) to 7(d), the liquid crystal display module further comprises a color film layer 80.

Figure 7A:
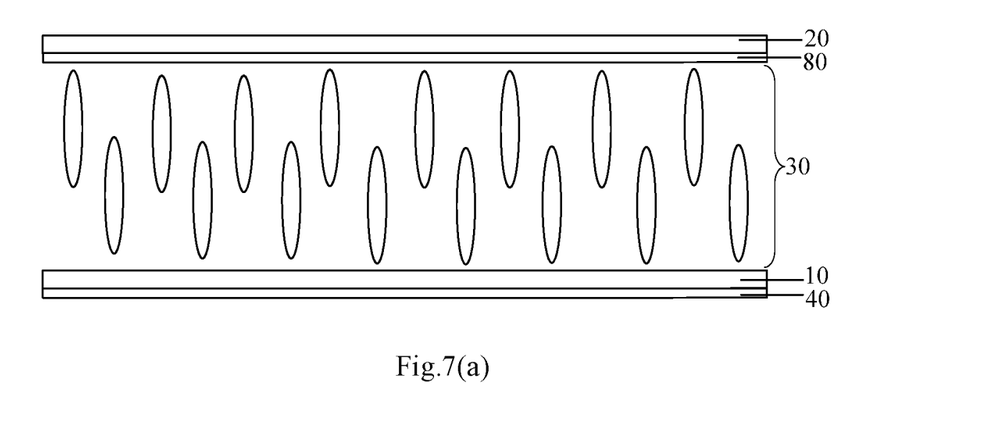
FIG. 7(a) is a structural schematic view of a liquid crystal display module comprising a color film layer provided according to an embodiment of the present disclosure.
Figure 7B:
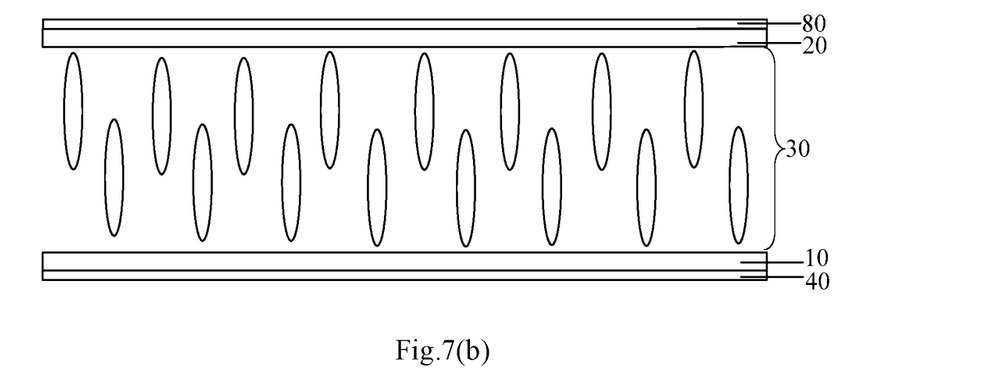
FIG. 7(b) is a structural schematic view of a further liquid crystal display module comprising a color film layer provided according to an embodiment of the present disclosure.
Figure 7C:
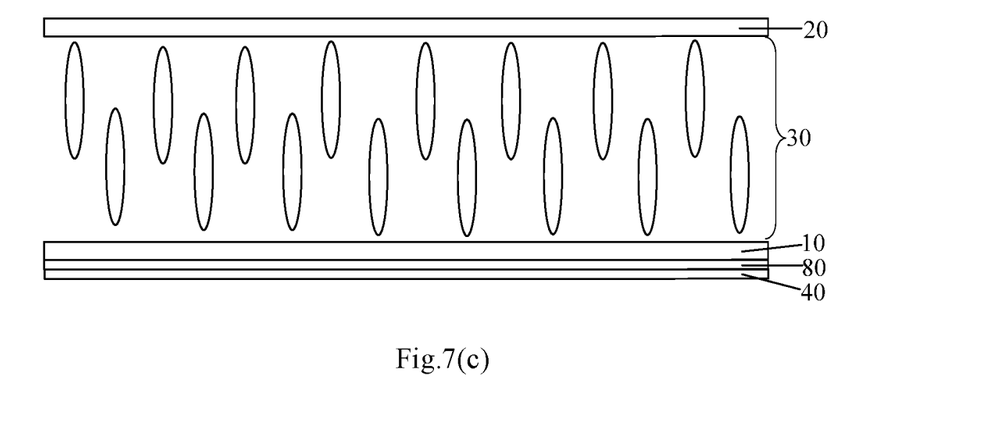
FIG. 7(c) is a structural schematic view of a yet liquid crystal display module comprising a color film layer provided according to an embodiment of the present disclosure.
Figure 7D:
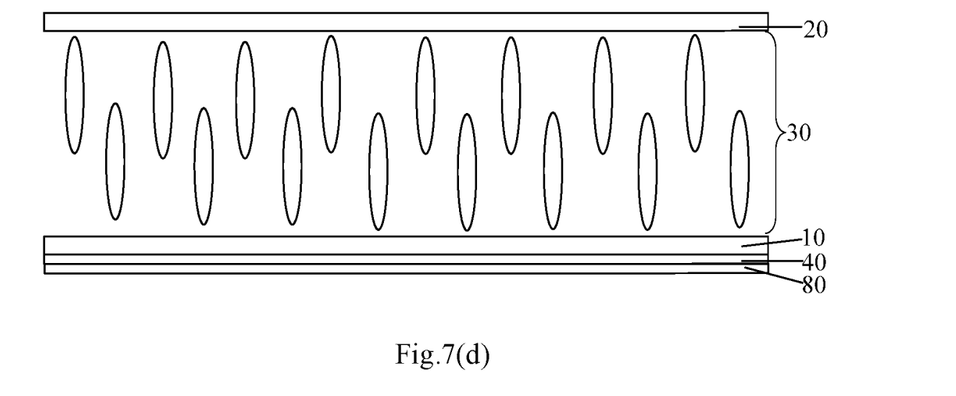
FIG. 7(d) is a structural schematic view of a still yet liquid crystal display module comprising a color film layer provided according to an embodiment of the present disclosure.

Here, the color film layer 80 is disposed in a position that enables the liquid crystal display module to realize color display. For instance, the color film layer 80 can be disposed, as shown in FIG. 7(a), at a side of the first substrate 10 or the second substrate 20 adjacent to the liquid crystal layer 30 (FIG. 7(a) schematically illustrates the color film layer is disposed at a side of the second substrate 20 adjacent to the liquid crystal layer 30), as shown in FIG. 7(b), disposed at a side of the second substrate 20 away from the liquid crystal layer 30, as shown in FIG. 7(c), of course disposed between the first substrate 10 and the first polarizer 40, or as shown in FIG. 7(d), disposed at a side of the first polarizer 40 away from the liquid crystal layer 30. When the liquid crystal display module further comprises the second polarizer 70, the color film layer 80 may also be disposed between the second substrate 20 and the second polarizer 70.

In an embodiment of the present disclosure, the color film layer 80 disposed in the liquid crystal display module can realize color display.

In an embodiment of the present disclosure, the liquid crystal display module further comprises a beam splitting film layer.

Here, the beam splitting film layer splits white light passing through the beam splitting film layer into light of different colors, so as to realize color display. Reference may be made to the disposed position of the color film layer for the disposed position of the beam splitting film layer, which are not reiterated herein.

In the embodiment of the present disclosure, the beam splitting film layer disposed in the liquid crystal display module can realize color display.

Figure 8:
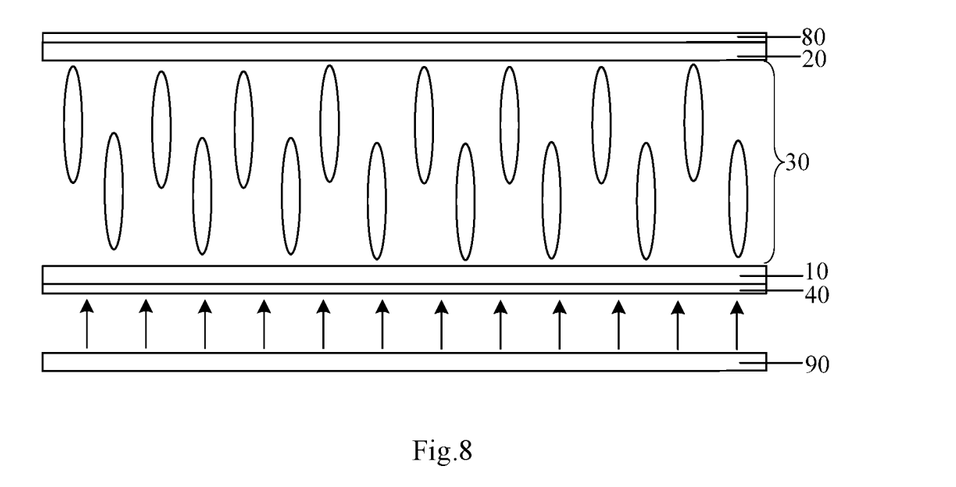
FIG. 8 is a structural schematic view of a liquid crystal provided according to an embodiment of the present disclosure.

A liquid crystal display comprising the liquid crystal display module and a backlight source 90 is further provided in an embodiment of the present disclosure as shown in FIG. 8. Here, the backlight source 90 emits parallel light towards the first substrate 10.

The direction of the parallel light emitted from the backlight source 90 is not limited here. For instance, the backlight source 90 can emit parallel light that is perpendicular to the first substrate 10 or the second substrate 20, or parallel light that is not perpendicular to the first substrate 10 or the second substrate 20.

A liquid crystal display is provided in an embodiment of the present disclosure. Since each sub-pixel region of the liquid crystal display is provided with an electrode set 50 and each electrode set 50 comprises a plurality of mutually insulated electrodes 501, a deflection angle of liquid crystals in each sub-pixel region can be controlled by controlling voltages of the electrodes 501 in the electrode set 50, so as to control a divergence angle of parallel polarized light after passing through the liquid crystal layer 30, resulting in a change in the light energy density in the space. In this way, each sub-pixel region can be controlled to realize the high greyscale display or the low greyscale display, so that the liquid crystal can realize different greyscale displays.

In an embodiment of the present disclosure, the liquid crystal display further comprises a camera for tracing a position of human eyes, and a controller for controlling light emitted from the backlight source 90 to be refracted by the liquid crystal layer 30 towards the position of the human eyes traced by the camera.

Since the camera and the controller are provided in the embodiment of the present disclosure, the light emitted from the backlight source 90 can be controlled by the controller to be refracted by the liquid crystal layer 30 towards the position of the human eyes traced by the camera. In this way, it is ensured that different greyscale displays can be realized when a person is at any position of the liquid crystal display.

The above description is only the embodiments of the present disclosure, and the protection scope of the present disclosure should not be limited thereto. Variations or alternations that can be readily envisaged by any skilled persons familiar with the art within the technical scope disclosed in the present disclosure shall be included in the protection scope of the present disclosure. Thus, the protection scope of the present disclosure shall be defined by the protection scope of the appended claims.

The invention claimed is:

1. A liquid crystal display module comprising: a first substrate and a second substrate cell-aligned with each other, and a liquid crystal layer disposed between the first substrate and the second substrate; and wherein
    the first substrate or the second substrate comprises a plurality of electrode sets, each electrode set including a plurality of mutually insulated electrodes and each electrode of an electrode set capable of being controlled separately,
    wherein the liquid crystal display module is divided into a plurality of sub-pixel regions, and in each sub-pixel region of the liquid crystal display module, a respective electrode set is disposed;
    the first substrate or the second substrate also comprises a common electrode, and the first substrate is disposed adjacent to a light incident side;
    said liquid crystal display module further comprise a first polarizer disposed on the first substrate, being configured to convert parallel light into parallel polarized light; and
    wherein, for each sub-pixel region, the plurality of electrodes of the electrode set in the sub-pixel region are configured to form respective electric fields with the common electrode to differently control deflection statuses of respective liquid crystals in the sub-pixel region according to a greyscale to be displayed by the sub-pixel region by having different voltages applied thereto, so that the parallel polarized light is refracted by the liquid crystals in the sub-pixel region towards different directions, and a divergence angle of said parallel polarized light emitted from the sub-pixel region gradually becomes larger when the greyscale to be displayed by the sub-pixel region changes from a high greyscale to a low greyscale.

2. The liquid crystal display module according to claim 1, wherein the electrode set comprises a plurality of stripe electrodes.

3. The liquid crystal display module according to claim 1, wherein the electrode set comprises a plurality of electrodes arranged in an array.

4. The liquid crystal display module according to claim 1, further comprising a second polarizer disposed on a side of the second substrate away from the liquid crystal layer; and wherein a light transmission axis of the second polarizer is parallel to a light transmission axis of the first polarizer.

5. The liquid crystal display module according to claim 1, further comprising a color film layer.

6. The liquid crystal display module according to claim 1, further comprising a beam splitting film layer.

7. The liquid crystal display module according to claim 1, wherein a light transmission axis of the first polarizer is parallel to an initial orientation of long axes of liquid crystal molecules in the liquid crystal layer.

8. The liquid crystal display module according to claim 1, wherein the common electrode is a planar common electrode.

9. A liquid crystal display comprising the liquid crystal display module according to claim 1 and a backlight source that emits parallel light towards the first substrate.

10. The liquid crystal display according to claim 9, further comprising a camera and a controller, wherein the camera is used for tracing a position of human eyes, and the controller is used for controlling the light emitted from the backlight source to be refracted by the liquid crystal layer towards the position of the human eyes traced by the camera.

11. The liquid crystal display according to claim 9, wherein the electrode set comprises a plurality of stripe electrodes.

12. The liquid crystal display according to claim 9, wherein the electrode set comprises a plurality of electrodes arranged in an array.

13. The liquid crystal display according to claim 9, further comprising a second polarizer disposed on a side of the second substrate away from the liquid crystal layer;
and wherein
a light transmission axis of the second polarizer is parallel to a light transmission axis of the first polarizer.

14. The liquid crystal display according to claim 9, further comprising a color film layer.

15. The liquid crystal display according to claim 9, further comprising a beam splitting film layer.

16. The liquid crystal display according to claim 9, wherein a light transmission axis of the first polarizer is parallel to an initial orientation of long axes of liquid crystal molecules in the liquid crystal layer.

17. The liquid crystal display according to claim 9, wherein the common electrode is a planar common electrode.

18. The liquid crystal display according to claim 9, further comprising a driver circuit configured to control voltages of the electrodes in the electrode set to control deflection status of the respective liquid crystals, so that light energy gradually changes from dense to sparse as a divergence angle of light emitted from the liquid crystal display module gradually becomes larger, so as to realize a change from high greyscale display to low greyscale display.

19. The liquid crystal display module according to claim 1, wherein the plurality of electrodes of the electrode set in the sub-pixel region are configured to have different voltages applied thereto so that the liquid crystals in the sub-pixel region equivalently form one or more prisms, and the number of prisms gradually becomes larger when the greyscale to be displayed by the sub-pixel region changes from a high greyscale to a low greyscale.

20. The liquid crystal display module according to claim 1, wherein the plurality of electrodes of the electrode set in the sub-pixel region are configured to have different voltages applied thereto so that the liquid crystals in the sub-pixel region equivalently form a prism with one or more bevel edges, and the number of bevel edges gradually becomes larger when the greyscale to be displayed by the sub-pixel region changes from a high greyscale to a low greyscale.

* * * * *